United States Patent [19]

Jensen et al.

[11] Patent Number: 4,507,583
[45] Date of Patent: Mar. 26, 1985

[54] PIEZO-ELECTRIC LEVEL DETECTOR

[75] Inventors: Niels D. Jensen; Hans O. Brunsgaard, both of Bjerringbro, Denmark

[73] Assignee: Grundfos A/S, Bjerringbro, Denmark

[21] Appl. No.: 576,118

[22] Filed: Feb. 2, 1984

[30] Foreign Application Priority Data

Feb. 3, 1983 [DK] Denmark .................... 439/83

[51] Int. Cl.³ ............................................ H01L 41/08
[52] U.S. Cl. .................................... 310/338; 310/323; 310/324; 310/340; 310/356; 73/290 V; 340/621
[58] Field of Search .................... 310/321–324, 310/340, 344, 363, 364, 330–332, 337, 338; 73/290 V, 703; 340/618, 621

[56] References Cited

U.S. PATENT DOCUMENTS

| 2,402,531 | 6/1946 | Christian | 310/337 X |
| 2,413,462 | 12/1946 | Massa | 310/340 X |
| 2,518,331 | 8/1950 | Kalin | 310/340 |
| 2,636,134 | 4/1953 | Arons et al. | 310/338 |
| 2,639,393 | 5/1953 | Birt et al. | 310/356 |
| 2,794,132 | 5/1957 | Zapponi | 310/340 |
| 2,806,966 | 9/1957 | Silver | 310/356 |
| 2,814,741 | 11/1957 | Minnick et al. | 310/356 |
| 3,299,301 | 1/1967 | Heilman et al. | 310/355 |
| 3,336,573 | 8/1967 | Galloway et al. | 310/338 X |
| 4,417,170 | 11/1983 | Benincasa | 310/344 X |

FOREIGN PATENT DOCUMENTS 906999  2/1946  France .

Primary Examiner—Mark O. Budd
Attorney, Agent, or Firm—Michael N. Meller

[57] ABSTRACT

The level detector is to be used for starting and stopping an electric system such as a pump. It comprises a piezo-electric crystal (31) squeezingly mounted between two elastically resilient membranes (22, 23) situated between two squeezing members (11, 12). These squeezing members form a top part (11) and a bottom part (12), respectively, which together form a sensor housing (10). On the outside the membranes are coated with a thin, insulating plastic layer (21, 24) and form the electric connection to the crystal. The two membranes are kept separated by means of a plurality of insulating, annular disks (25–28). In this manner a sturdy and reliable mounting of the piezo-electric crystal is obtained.

14 Claims, 5 Drawing Figures

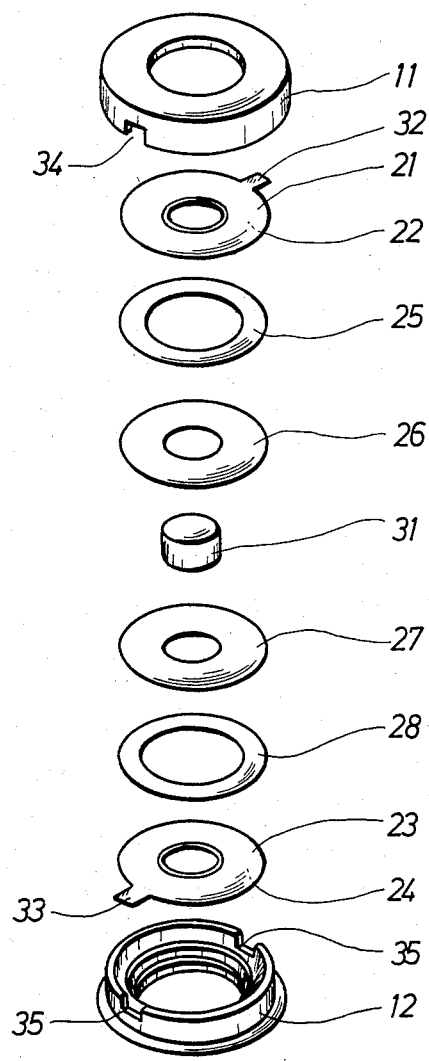

PIEZO-ELECTRIC LEVEL DETECTOR

FIELD OF THE INVENTION

The invention relates to a level detector comprising a piezo-electric crystal for starting and stopping an electric system.

BACKGROUND ART

British patent application No. 8,111,180 discloses a level detector comprising a piezo-electric crystal. The production of such a level detector is, however, encumbered with the problem of mounting the piezo-electric crystal in such a manner that the properties of the crystal are not reduced due to the mounting procedure.

SUMMRY OF THE INVENTION

The object of the invention is to provide a level detector which is more reliable and sturdy than the known detectors.

In satisfaction of the foregoing object and advantages, there is provided by the present invention a crystal which is squeezingly mounted between two elastically resilient membranes. In this manner a reliable mounting of the piezo-electric crystal is obtained, which is particularly advantageous by not requiring a soldering of the crystal, since such a process can damage the crystal and reduce its piezo-electric properties. At the same time the crystal is well protected between the two membranes.

According to the invention the two elastically resilient membranes may be situated between two squeezing members, whereby an easy and advantageous mounting of the two membranes holding the crystal is obtained.

According to the invention the two squeezing members may form a top part and a bottom part, respectively, which together form a sensor housing, e.g. for mounting in a perforation in a container wall. As a result, an advantageous mounting of the sensor is obtained, which thus may be situated in the container wall in direct contact with the liquid, the level of which is to be controlled.

According to the invention the top part of the sensor housing may tightly surround a portion of the bottom part of the sensor housing, whereby an advantageous embodiment of the sensor housing is obtained, said embodiment permitting an easy assembling of the housing.

According to the invention the level detector may be adapted in such a manner that one membrane or both membranes comprise at least one insulating layer and at least one electrically conductive layer, and that the two insulating membranes are kept separated and consequently mutually electrically separated by means of a plurality of insulating, annular disks, preferably plastic disks. As a result, the membranes may act as electric, insulated conductors for the voltages arising in the piezo-electric crystal at the same time as they form a layer of separation between the piezo-electric crystal and the surroundings.

Each membrane may according to the invention comprise an approximately 0.1 mm thick conductive plate or film, e.g. a brass alloy, which is coated with an approximately 0.1 mm thick insulating, preferably smooth film such as for instance a plastic film. In this manner an advantageous embodiment is obtained since the membrane is thereby outwardly insulated at the same time as the smooth plastic film has a repellent effect towards the impurities present in the liquid to be controlled According to the invention one or more of the insulating, membrane-separating annular disks may be of an internal hole diameter substantially corresponding to the diameter of the piezo-electric crystal, or more generally the opening of the annular disk may be shaped in such a manner that it fits the shape of the piezo-electric crystal. As a result, the crystal is "radially" fixed by means of the insulating disks, whereas it is "axially" fixed by means of the membranes mentioned in claim 1. The terms "axially" and "radially" are used in this connection between the preferred embodiment of the sensor housing is symmetric with respect to rotation. This feature is, however, only an advantageous embodiment and it is irrelevant to the scope of the invention since both the sensor housing and the crystal may be shaped in many different manners, e.g. as a polygon.

According to the invention the squeezing members of the sensor housing may be provided with a plurality of squeezing means, the elastically resilient membranes and the insulating, annular disks being situated between said squeezing means. In this manner a reliable fixation of the membranes and the disks is obtained. The squeezing means are preferably annular.

BRIEF DESCRIPTION OF DRAWING

The invention will be described below with reference to the accompanying drawing, in which FIG. 5 is an exploded view of the level detector of FIG. 4.

DESCRIPTION OF PREFERRED EMBODIMENTS

Figure 1:
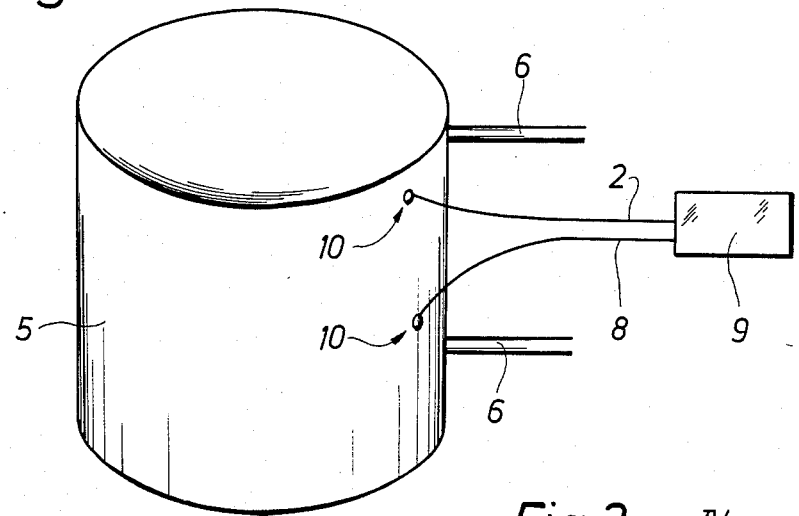
FIG. 1 illustrates a container with two level detectors according to the invention.
Figure 2:
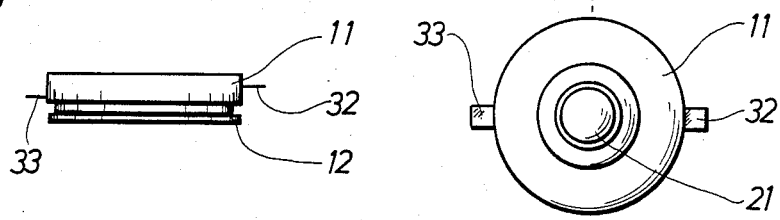
FIG. 2 is a side view of an embodiment of a level detector according to the invention.
Figure 3:
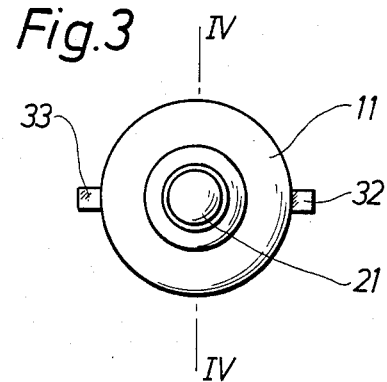
FIG. 3 is a top view of the embodiment of FIG. 2.
Figure 4:
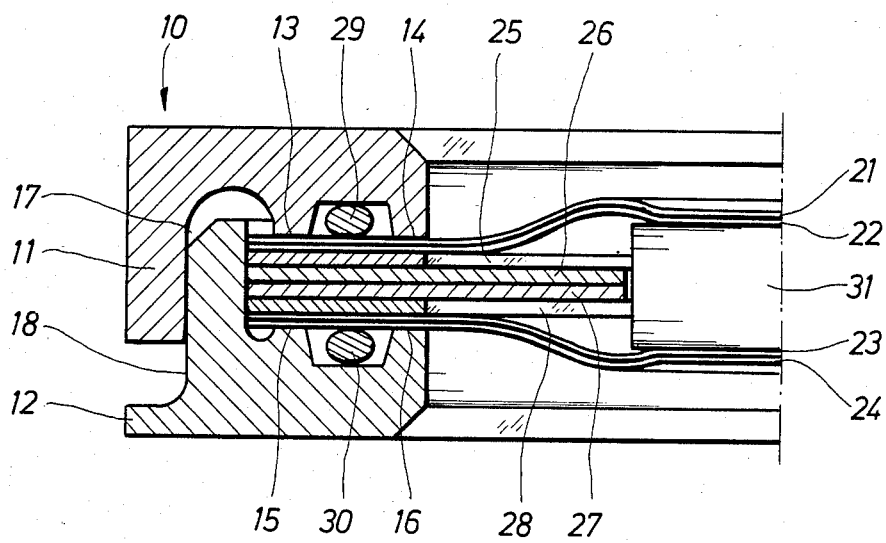
FIG. 4 is an enlarged sectional view through the level detector along the line IV—IV of FIG. 3.

FIG. 1 illustrates a container 5, the liquid level of which is to be controllable or adjustable. The liquid level may for instance be adjusted by means of the two pipelines 6 through adjustment means not shown. Two level detectors 10 are mounted in the wall of the container, and through electric conduits 8 these detectors are connected with an electric circuit 9 controlling, displaying, and/or adjusting the liquid level. The electric circuit 9 may be of conventionally known art and is therefore not described more detailed.

The embodiment of the level detector illustrated in FIGS. 2–5 comprises a housing with a top part 11 and a bottom part 12, which both are annular. Both parts are provided with squeezing members 13, 14, 15, 16 which are annular too and which oppose each other. Internally the top part 11 is shaped in such a manner that a cylindrical surface 17 facing inwards appears. Correspondingly, the bottom part 12 is shaped in such a manner that a cylindrical surface 18 facing outwards appears. The bottom part 12 with the surface 18 fits tightly into the top part 11 with the surface 17 and is preferably glued to said top part. The sensor housing is made of a nonconductive material, e.g. plastics, and may be cast and/or turned.

Two membranes 21–24 are squeezingly mounted between the annular surfaces of the squeezing members 13, 14, 15, 16. These membranes are thin, resilient, slightly curved plates 22, 23 of a suitable alloy such as for instance brass, and they are coated with a thin, smooth layer of plastics 21, 24. This smooth plastic layer has partly an insulating effect and partly a dirt-repellent effect. Since impurities under certain circumstances may collect in a liquid container, it is advantageous that the level detector is dirt-repellent in order to avoid the container being covered by dirt.

The membranes 21, 22 and 23, 24 are mutually separated by disks 25, 26, 27, 28. The two disks 26, 27 in the middle are insulating plastic disks separating the membranes electrically. In the middle of the insulating disks 26, 27, the piezo-electric crystal 31 is mounted. These disks cause a fixation of the piezo-electric crystal in radial direction. The other disks 25, 28 are in the preferred embodiment also insulating disks. According to another embodiment not shown, the disks 25, 28 are electrically conductive disks abutting the conductive surface of the membranes and forming terminals for the electric voltages arising above the piezo-electric crystal. According to the preferred embodiment, the membranes 22, 23 are per se formed with terminals 32, 33, cf. FIGS. 2, 3, and 5. The top 11 and bottom 12 of the sensor housing are individually provided with two recesses 34 and 35, respectively. The illustrated disks 25, 26, 27, 28 may in a modified embodiment be integrally formed.

If necessary, an elastic seal ring 29, such as for instance a rubber ring, may be provided in the annular space of the top part 11 between the annular squeezing members 13, 14. Correspondingly, an elastic ring 30 may be provided in the bottom part 12. These two elastic rings seal against penetrating liquid.

At the two opposing end surfaces, the crystal 31 is in direct contact with the conductive inner sides of the membranes 22 and 23.

When the sensor housing 10 with the crystal 31 has been mounted in a container, the side coated with plastics, i.e. 21 and/or 24, of one or both membranes is in contact with the liquid of the container, provided the liquid level exceeds the position of the sensor. The electric characteristic of the crystal 31 depends on the liquid level. The electric properties of the crystal influence an electric measuring circuit through the two conductive membranes 22, 23 and connecting conduits not shown, said measuring circuit optionally being connected to display means and adjustment means of known art.

We claim:

1. A level detector for starting and stopping an electric system comprising a piezo-electric crystal; two resilient sheet elements constituting contact surfaces for the crystal and situated one on each side of the crystal; wherein said resilient sheet elements are insulated on the outside; and a sensor housing surrounding said resilient sheet elements liquid-tightly along the edge but allowing a substantial portion of at least one of the outwardly insulated outsides of the sheet elements to be uncovered, said sensor housing consisting of a top part and a bottom part, each part being provided with a plurality of squeezing means, the two resilient sheet elements being situated between said squeezing means.

2. The level detector as claimed in claim 1, wherein at least one resilient sheet element consists of an insulating layer and an electrically conductive layer and the two insulated resilient sheet elements are kept separated and consequently mutually electrically separated by means of a plurality of insulating, annular disks.

3. The level detector as claimed in claim 2, wherein said insulating annular disks are made of plastic.

4. The level detector as claimed in claim 2, wherein at least one of the insulating disks has an internal hole diameter substantially corresponding to the diameter of the piezo-electric crystal.

5. The level detector as claimed in claim 2, wherein at least one of the insulating disks has an internal hole which fits the shape of the piezo-electric crystal.

6. The level detector as claimed in claim 2, wherein the resilient sheet elements comprise an electrically conductive film being about 0.1 mm thick, and an insulating, smooth film being about 0.1 mm thick.

7. The level detector as claimed in claim 15, wherein said insulating film is made of plastic.

8. The level detector as claimed in claim 1, wherein two coaxial first squeezing means are present in the top part, and an elastic sealing ring is situated between said first squeezing means coaxially therewith, and the bottom part comprises opposing, coaxial second squeezing means and an intermediate, elastic sealing ring coaxially situated relative to said second squeezing means.

9. The level detector as claimed in claim 1, wherein the top part of the sensor housing tightly surrounds a portion of the bottom part of the sensor housing and is secured to said bottom part.

10. The level detector as claimed in claim 9, wherein the top part of the sensor housing is secured to the bottom part by means of an adhesive.

11. The level detector as claimed in claim 2, wherein the sensor housing consists of a top part and a bottom part, each part being provided with a plurality of squeezing means, the two resilient sheet elements and the disks being situated between said squeezing means.

12. The level detector as claimed in claim 11 wherein two coaxial first squeezing means are present in the top part, and an elastic sealing ring is situated between said first squeezing means coaxially therewith, and the bottom part comprises opposing, coaxial second squeezing means and an intermediate, elastic sealing ring coaxially situated relative to said second squeezing means.

13. The level detector as claimed in claim 11, wherein the top part of the sensor housing tightly surrounds a portion of the bottom part of the sensor housing and is secured to said bottom part.

14. The level detector as claimed in claim 13, wherein the top part of the sensor housing is secured to the bottom part by means of an adhesive.

* * * * *